३,८२५,५८०
HEAT-RESISTANT ADHESIVE COMPOSITIONS CONTAINING RADICAL POLYMERIZABLE ALPHA-CYANOACRYLATES

Hiroyuki Kato, Isao Tsuzi, Kishiro Azuma, and Hidemaro Tatemichi, Nagoya, Japan, assignors to Toagosei Chemical Industry Co., Ltd., Tokyo, Japan
No Drawing. Original application Aug. 16, 1971, Ser. No. 172,282, now abandoned. Divided and this application Dec. 13, 1972, Ser. No. 314,507
Claims priority, application Japan, Aug. 18, 1970, 45/71,737
Int. Cl. C07c *121/18*
U.S. Cl. 260—465.4        1 Claim

ABSTRACT OF THE DISCLOSURE

A heat-resistant adhesive composition comprising a radical polymerizable α-cyanoacrylate represented by the formula, $$CH_2=C(CN)COOR$$

wherein R is an alkenyl, alkinyl, alkenyloxyalkyl or cycloalkenyl group, and at least 0.1% by weight based on the weight of the composition of a radical initiator. The said adhesive composition is not only instantaneously adhesive at room temperature but also has a sufficiently practical bonding strength even at such a high temperature as 150° C. or above.

---

This is a Divisional Application of applicants' pending application Ser. No. 172,282, filed Aug. 16, 1971, now abandoned.

This invention relates to heat-resistant cyanoacrylate type adhesive compositions, particularly those having instantaneous adhesion.

Cyanoacrylates are cured by means of water contained in air and show strong instantaneous adhesion at room temperature to metals, glass and plastics, so that they have heretofore been used for various purposes as main ingredients of instantaneous adhesive compositions.

However, cyanoacrylate type adhesives are extremely low in resistance to heat, water and impact. For example, methyl cyanoacrylate type and ethyl cyanoacrylate type adhesives which are commercially available at present are greatly deteriorated in bonding strength at temperatures above 100° C. Since cyanoacrylate type instantaneous adhesives usable at temperatures above 150° C. have not been found as yet, the development of such adhesives is strongly desired.

An object of the present invention is to provide cyanoacrylate type instantaneous adhesive compositions which are free from the above-mentioned drawbacks of the conventional cyanoacrylate type adhesives and which have sufficiently practical bonding strengths even at such high temperatures as above 150° C.

With an aim to accomplish the above object, the present inventors made extensive studies to find that a composition comprising an α-cyanoacrylate represented by the formula CH$_2$=C(CN)COOR, wherein R is a radical polymerizable functional group, e.g. an alkenyl, alkinyl, alkenyloxyalkyl or cycloalkenyl group, (hereinafter, the said α-cyanocrylate will be referred to as "radical polymerizable α-cyanoacrylate"), and a radical initiator can be a heat-resistant, instantaneous adhesive composition. Based on the above finding, the inventors have accomplished the present invention.

As the above-mentioned radical polymerizable α-cyanoacrylates which are used in the present invention, there may be shown various compounds. For example, the α-cyanoacrylates having alkenyl groups (preferably having 3 to 8 carbon atoms) include allyl α-cyanoacrylate, methallyl α-cyanoacrylate and crotyl α-cyanoacrylate; the α-cyanoacrylates having alkinyl groups (preferably having 3 to 8 carbon atoms) include propargyl α-cyanoacrylate, 1,1-dimethyl-2-propynyl α-cyanoacrylate, 1-methyl-1-ethyl-2-propynyl α-cyanoacrylate and 1-methyl-1-isobutyl-2-propynyl α-cyanoacrylate; the α-cyanoacrylates having alkenyloxyalkyl groups (preferably having 5 to 8 carbon atoms) include allyloxyethyl α-cyanoacrylates and allyloxypropyl α-cyanoacrylate; and the α-cyanoacrylates having cycloalkenyl groups (preferably having 6 to 8 carbon atoms) include 2-cyclohexenyl α-cyanoacrylate and the like. Among the above-mentioned α-cyanoacrylates, allyl α-cyanoacrylate and propargyl α-cyanoacrylate are particularly preferable for use in the present invention, because of their being high in bonding strength at normal temperature and in radical polymerizability.

The radical polymerizable α-cyanoacrylates mentioned in the above can be individually obtained according to a method in which a condensation product of a corresponding α-cyanoacetate with formaldehyde is depolymerized, or to a method in which an alkyl α-cyanoacrylate such as methyl or ethyl α-cyanoacrylate is subjected to ester exchange reaction with a monohydric alcohol having such functional group as mentioned previously, e.g. allyl alcohol or propargyl alcohol.

The radical initiators used in the present invention are not particularly limited in kind, and include known radical initiators such as, for example, various peroxides, azo compounds and sulfur-containing compounds. Particularly effective radical initiators are organic peroxides which may be used alone or in admixture of two or more and which include, for example, ketone peroxides such as methylethylketone peroxide and cyclohexanone peroxide; hydroperoxides such as cumene hydroperoxide and t-butyl hydroperoxide; dialkyl peroxides such as dicumyl peroxide and di-tert-butyl peroxide; peroxy-esters such as t-butyl peroxybenzoate and t-butyl peroxy-isopropylcarbonate; organic acid peroxides such as succinic acid peroxide and t-butylperoxymaleic acid; and diacyl peroxides such as benzoyl peroxide and the like. Dialkyl peroxides and per-oxy-esters are preferable. However, it is, of course, possible to use other radical initiators, e.g. azo compounds such as azobisisobutyronitrile, phenyl-azoallyl sulfone and derivatives thereof; sulfur-containing compounds such as ammonium persulfate, sulfur and tetramethylthiuram mono- and di-sulfides; hydrogen peroxide; and N-nitrile-N-amyl compounds.

The radical initiators used in the present invention include various compounds and are not particularly limited in kind, as mentioned above. In carrying out the present process on commercial scale, however, the use of radical initiators which show a half life of 10 hours at temperatures of 80° to 140° C. is desirable in view of the stability of the resulting compositions.

The present compositions comprising the above-mentioned radical polymerizable α-cyanoacrylates and radical initiators may be incorporated, to such extents as not to injure the later-mentioned characteristics of the present invention, with acidic stabilizers such as sulfur dioxide and p-toluenesulfonic acid; polymerization inhibitors such as hydroquinone, benzoquinone and methoxyhydroquinone; plasticizers such as dibutyl phthalate and tricresyl phosphate; monomers such as diallyl phthalate, allyl acrylate and triallyl phosphate; viscosity increasing polymers such as polyacrylic acid esters and the like; and dyes for coloration. It is also possible to incorporate therein cyanoacrylates such as methyl cyanoacrylate, ethyl cyanoacrylate, isobutyl cyanoacrylate and 2-ethylhexyl cyanoacrylate; vinylidene cyanide; and methylenemalonic acid esters such as dimethyl methylenemalonate and the like, which are capable of being anionically polymerized with water.

Characteristics of the present composition comprising the aforesaid radical polymerizable α-cyanoacrylate and radical initiator are explained in further detail below.

The present composition can provide instantaneous adhesion even at room temperature, and the adhesion speed thereof does not substantially change, in general, even if the radical initiator is present. When coated at room temperature on materials to be bonded, the composition is anionic-polymerized due to water, which has adsorbed or adhered onto the surfaces of said materials, to become a mixture of the radical initiator and a β-polymer formed by the chain-opening of double bond present between two carbon atoms in the α- and β-positions of the α-cyanoacrylate. In this case, a tensile bonding strength of 100 to 300 kg./cm.² can be attained. When the bonded materials are subjected to heating, the radical initiator contained in said mixture decomposes to yield a radical, and such functional group as allyl or propargyl group radical-polymerizes, whereby the above-mentioned β-polymer is crosslinked to an infusible and insoluble three dimensional polymer (γ-polymer). Thus, the adhesive composition of the present invention, when subjected to heating, takes the three dimensional structure, and hence is far more excellent in heat resistance than the known cyanoacrylate type adhesive. A specific technical idea of the present invention resides in the finding of an instantaneous adhesive composition capable of taking such structure as mentioned above. In the above case, the concentration of the radical initiator is preferably at least 0.1% by weight based on the weight of the adhesive composition, so as to carry out sufficiently the crosslinking of such a β-polymer as mentioned above. However, if the concentration is more than 10% by weight, the proportion of non-polymerizable material increases, and the adhesion of the resulting composition tends to lower quickly. Further, said β-polymer is generally in a glass state at a temperature lower than 100° C., and hence, the molecular movement of the polymer is difficult to cause. Accordingly, the crosslinking of said polymer is generally preferably effected at a temperature of 100° to 120° C. Therefore, the radical initiators used in the present invention preferably have a decomposition temperature higher than said temperatures. As mentioned above, the reason why dialkylperoxides and peroxyesters are preferable is that these radical initiators have in general such decomposition temperatures. Said radical initiators are suitable both in storage stability and cross-linking.

The adhesive composition of the present invention, like the known cyanoacrylate adhesive, is widely applicable to metals, glass and plastics. When the present adhesive composition is used to bond, for example, 2 iron plates at 20° C., a sufficient bonding can be attained within 1 minute after application of the composition, and the bonding strength thereof is sufficiently high even at such a high temperature as 200° C. Considering the fact that the known cyanoacrylate adhesive provides no substantial adhesion at an elevated temperature of more than 150° C., it is understood how excellent is the present composition in heat resistance as compared with the known adhesive.

As mentioned above, the adhesive composition of the present invention has overcome the lack of heat resistance, which is a great drawback of the known instantaneous adhesive, and is substantially identical in instantaneous adhesion and bonding strength at normal temperature with the known instantaneous adhesive. Moreover, when the present composition is subjected to heating, the adhesive polymer contained in the composition takes a three dimensional reticular structure, so that the composition becomes markedly excellent in chemical resistance.

The present invention is illustrated in further detail below with reference to examples, reference examples and comparative examples. The measurement of adhesion was carried out according to the method shown below to calculate the tensile bonding strength of each adhesive composition.

Method for measurement of tensile bonding strength: Two iron test pieces (in all the examples shown below, iron test pieces were used as substrates) having a cross-sectional area of 5 mm. x 20 mm. were bonded to each other at room temperature by use of an adhesive composition, allowed to stand at room temperature for a definite period of time (ordinarily for 24 hours), and then heated at a definite temperature for a definite period of time. Subsequently, the bonded test pieces were subjected to a tensile tester maintained at the same temperature as the heating temperature, and the bonding strength of the adhesive composition was measured at a tensile rate of 50 mm./min.

Reference Example 1

A mixture comprising 494 g. of allyl alcohol, 681 g. of cyanoacetic acid, 1,000 g. of benzene and 35 g. of p-toluenesulfonic acid was fed to a 3 liter glass flask equipped with a stirrer, a cooler and a water separator, and then heated with stirring. When the inner temperature of the flask became 70° C., an azeotropic mixture of formed water and the benzene distilled. After cooling with the cooler, the azeotropic mixture was separated by means of the water separator into a water layer and a benzene layer. The benzene layer was returned to the flask, and the water layer was removed out of the system. After 5 hours, the temperature of the flask became 86° C., and the theoretical amount of water completed the distillation. Subsequently, the benzene was removed by distillation at normal pressure and, after substantial distillation of the benzene, the pressure was gradually reduced to obtain under a pressure of 5 mm. Hg, 795 g. of a colorless transparent liquid as a main fraction, b.p. 92° C., $n_D^{19}$ 1.4422.

Elementary analysis.—Calculated (percent): C, 57.6; H, 5.6; N, 11.2. Found (percent): C, 57.5; H, 5.6; N, 11.0.

According to gas chromatography and infrared analysis, it was confirmed that the product was allyl cyanoacetate.

Subsequently, 500 g. of trichloroethylene and 94 g. of paraformaldehyde were charged into a 1 liter glass reactor equipped with a stirrer, a dropping funnel, a cooler and a water separator, and then heated to reflux the trichloroethylene. Thereafter, a mixture comprising 375 g. of the above-mentioned allyl cyanoacetate and 0.3 cc. of piperidine was charged into the dropping funnel, and gradually dropped into the reactor over a period of 2 hours. Water formed during the reaction azeotropically distilled together with the trichloroethylene. The water layer was removed out of the system, and the trichloroethylene layer was returned to the reactor. After carrying out the reaction for 6 hours, the trichloroethylene was removed under reduced pressure, whereby a reactive viscous condensation product of the allyl cyanoacetate with the formaldehyde was left in the reactor. To this condensation product were added 6 g. of p-toluenesulfonic acid, 4.5 g. of hydroquinone and 6 g. of phosphorus pentoxide, and the resulting mixture was depolymerized under the conditions of 150° to 170° C. and 7 to 5 mm. Hg to obtain 265 g. of a pale yellow liquid having a boiling point of 89° to 95° C. The thus obtained liquid had an ability to bond iron test pieces in 2 minutes. This liquid was re-distilled to obtain 240 g. of a colorless transparent fraction having a boiling point of 78 to 81° C./ 4 mm. Hg (uncorrected). The thus obtained liquid had a specific gravity of 1.046 (at 20° C.), a viscosity of 6.4 cps. (at 20° C.) and a refractive index of $n_D^{20}$ 1.4574. According to gas chromatography and infrared analysis and from the results of elementary analysis set forth below, it was found that the liquid was allyl cyanoacrylate of substantially 100% in purity.

Elementary analysis.—Calculated (percent): C, 61.3; H, 5.1; N, 10.2. Found (percent): C, 61.5; H, 5.5; N, 10.2.

Using two iron test pieces, the liquid was measured in tensile bonding strength, whereby the liquid could bond the test pieces in 30 seconds and the bonding strength thereof after aging for 24 hours was 127 kg./cm.$^2$

Reference Example 2

A mixture comprising 262 g. of propargyl alcohol, 398 g. of cyanoacetic acid, 500 g. of benzene, 12.7 g. of p-toluenesulfonic acid and 6.4 g. hydroquinone was fed to a 2 liter glass flask equipped with a stirrer, a cooler and a water separator, and then reacted at an azeotropic temperature of the benzene and water formed during the reaction. The water distilled was removed out of the system, and the benzene was returned to the flask. After reacting for 12 hours, the reaction mixture was washed with a 5% aqueous caustic soda solution and then with water, and the benzene was removed by distillation under normal pressure. After removal of the benzene, a fraction having a boiling point of 88° to 89° C. was recovered under a reduced pressure of 3 mm. Hg to obtain 250 g. of a colorless transparent liquid having a specific gravity of 1.1356 (at 30° C.), a refractive index of 1.4520 (at 27° C.) and a viscosity of 10.8 cps. (at 24° C.). According to infrared analysis and from the results of elementary analysis, it was confirmed that the liquid was propargyl cyanoacetate.

Elementary analysis.—Calculated (percent): C, 58.54; H, 4.09; N, 11.38. Found (percent): C, 58.58; H, 4.10; N, 11.37.

Subsequently, 32 g. of paraformaldehyde and 300 g. of trichloroethylene were charged into a 1 liter glass flask equipped with a stirrer, a cooler, a dropping funnel and a water separator, and then heated with stirring to reflux the trichloroethylene. On the other hand, a mixture comprising 123 g. of the above-mentioned propargyl cyanoacetate and 0.5 ml. of piperidine was charged into the dropping funnel, and then dropped into the flask over a period of 1 hour. Water formed during the reaction formed an azeotropic mixture with the trichloroethylene, and came to distill. The water layer was removed out of the system and the trichloroethylene was returned to the flask. The reaction terminated in 3 hours, and substantially the theoretical amount of water distilled. The product was a trichloroethylene- and benzene-insoluble pale yellow solid formed by condensation of the propargyl cyanoacetate with the paraformaldehyde. This solid was sufficiently washed with methanol and then dried under reduced pressure. To 120 g. of the dried condensation product were added 2.2 g. of p-toluenesulfonic acid, 0.6 g. of hydroquinone and 2 g. of phosphorus pentoxide, and the resulting mixture was depolymerized under the conditions of 150° to 180° C. and 3 mm. Hg to obtain 63 g. of a fraction having a boiling point of 62° C. This fraction was a colorless transparent liquid and confirmed to be propargyl cyanoacrylate according to infrared analysis and from the results of elementary analysis set forth below.

Elementary analysis.—Calculated (percent): C, 62.22; H, 3.73; N, 10.37. Found (percent): C, 62.20; H, 3.75; N, 10.38.

Using two iron test pieces, the thus obtained liquid was measured in tensile bonding strength, whereby the liquid could bond the test pieces in 30 seconds, and the bonding strength thereof after aging for 24 hours was 298 kg./cm.$^2$

Example 1

The allyl α-cyanoacrylate prepared in Reference Example 1 was incorporated with 3% by weight of each of the organic peroxides shown in Table 1 to obtain a composition. This composition was used to bond two iron test pieces and then heated at 150° C. for 1 or 3 hours, and the tensile bonding strength thereof was measured at 150° C. The results obtained were as set forth in Table 1.

TABLE 1

| Trade name[1] | Chemical name | Heating time (hr.) | Bonding strength (kg./cm.$^2$) |
|---|---|---|---|
| Perbutyl H | t-Butyl hydroperoxide | 1 | 43 |
| Percumyl D | Dicumyl peroxide | 1 | 50 |
| Permek N | Methylethylketone peroxide | 1 | 84 |
| Perbutyl Z | t-Butyl peroxybenzoate | 1 | 25 |
| Perhexa H | Cyclohexanone peroxide | 3 | 56 |
| Percumyl H | Cumene hydroperoxide | 3 | 86 |

[1] Trademark of Nippon Yushi Co.

Comparative Example 1

Each of the alkyl α-cyanoacrylates shown in Table 2 was used, either singly or in combination with a radical initiator, to bond two iron test pieces and heated at 150° C. for 1 hour, and the tensile bonding strength thereof at 150° C. was measured. The results obtained were as set forth in Table 2.

TABLE 2

| Alkyl group of alkyl α-cyanoacrylate | Peroxide Name of compound | Concentration (wt. percent) | Bonding strength (kg./cm.$^2$) |
|---|---|---|---|
| Methyl | None | 0 | 0 |
| Ethyl | do | 0 | 36 |
| Allyl | do | 0 | 5 |
| Isobutyl | do | 0 | 0 |
| Methyl | Methylethylketone peroxide | 3 | 0 |
| Ethyl | do | 3 | 0 |

Example 2

A composition comprising allyl α-cyanoacrylate and 3% by weight of Permek N was used to bond two iron test pieces, heated at 150° C. for such a period of time as shown in Table 3, and then subjected to tensile test at said temperature to examine the influence of heating time. The results obtained were as set forth in Table 3.

Comparative Example 2

Example 2 was repeated, except that each of methyl, ethyl and allyl α-cyanoacrylate was used singly to bond the iron test pieces. The results obtained were as set forth in Table 3.

TABLE 3

| | α-Cyanoacrylate | Radical initiator | Tensile bonding strength (kg./cm.$^2$) in heating time of— | | | |
|---|---|---|---|---|---|---|
| | | | 1 hr. | 3 hr. | 5 hr. | 7 hr. |
| Example 2 | Allyl α-cyanoacrylate | Methylethylketone peroxide | 84 | 72 | 65 | 68 |
| Comparative Example 2 | Methyl α-cyanoacrylate | None | 1 2 | 1 2 | 1 2 | 1 2 |
| | Ethyl α-cyanoacrylate | do | 35 | 30 | 33 | 33 |
| | Allyl α-cyanoacrylate | do | 5 | 1 2 | 1 2 | 1 2 |

[1] Or less.

Example 3

A composition comprising the propargyl-α-cyanoacrylate prepared in Reference Example 2 and 3% by weight of Permek N was used to bond two iron test pieces, heated at 150° C. and 190 C. for a definite period of time and then subjected to tensile test at said temperature to examine the influence of heating time. The results obtained were as set forth in Table 4.

TABLE 4

| Heating time (hr.) | Bonding strength (kg./cm.$^2$) at— | |
|---|---|---|
| | 150° C. | 190° C. |
| 1 | 21 | 48 |
| 3 | 62 | 44 |
| 5 | 50 | 53 |
| 7 | 55 | 44 |

Example 4

The same test as in Example 2 was effected at 173° C. The results obtained were as set forth in Table 5.

Comparative Example 3

The same test as in Comparative Example 2 was effected at 173° C. The results obtained were as set forth in Table 5.

TABLE 5

| | α-Cyano-acrylate | Radical initiator | Tensile bonding strength (kg./cm.$^2$) in heating time of— | | | |
|---|---|---|---|---|---|---|
| | | | 1 hr. | 3 hr. | 5 hr. | 7 hr. |
| Example 4 | Allyl α-cyanoacrylate. | Methylethyl ketone peroxide. | 57 | 62 | 82 | 71 |
| Comparative Example 3. | Methyl α-cyanoacrylate. | None | 1.5 | 1.5 | 1.0 | 1.0 |
| | Ethyl α-cyanoacrylate. | ___do___ | 1.5 | 1.5 | 1.0 | 1.0 |
| | Allyl α-cyanoacrylate. | ___do___ | 1.5 | 1.5 | 1.0 | 1.0 |

Example 5

A composition comprising allyl α-cyanoacrylate and 3% by weight of Permek N was used to bond two iron test pieces, heated at temperatures within the range from 120° to 195° C. for 3 hours, and then subjected to tensile test at said temperature to examine the influence of heating temperature. The results obtained were as set forth in Table 6.

Comparative Example 4

Example 5 was repeated, except that each of methyl, ethyl and allyl α-cyanoacrylates was used singly. The results obtained were as set forth in Table 6.

TABLE 6

| | α-Cyano-acrylate | Radical initiator | Tensile bonding strength (kg./cm.$^2$) at heating temperature of— | | | |
|---|---|---|---|---|---|---|
| | | | 120° C. | 150° C. | 173° C. | 195° C. |
| Example 5 | Allyl α-cyanoacrylate. | Methylethyl ketone peroxide. | 85 | 71 | 62 | 35 |
| Comparative Example 4. | Methyl α-cyanoacrylate. | None | 28 | 0 | 0 | 0 |
| | Ethyl α-cyanoacrylate. | ___do___ | 82 | 30 | 0 | 0 |
| | Allyl α-cyanoacrylate. | ___do___ | 15 | 0 | 0 | 0 |

Example 6

A composition comprising allyl α-cyanoacrylate and 0 to 10% by weight of Permek N was used to bond two iron test pieces, allowed to stand at normal temperature and 150° C. for 1 hour, and then measured in tensile bonding strength at 150° C. The results obtained were as set forth in Table 7.

TABLE 7

| Amount of peroxide (wt. percent) | Tensile bonding strength (kg./cm.$^2$) at— | |
|---|---|---|
| | Normal temperature | 150° C. |
| 0 | 127 | 5 |
| 1 | 155 | 53 |
| 3 | 150 | 84 |
| 4 | 150 | 85 |
| 8 | 140 | 28 |
| 10 | 130 | 10 |

Example 7

A mixture comprising 80% by weight of allyl α-cyanoacrylate and 20% by weight of each of the alkyl α-cyanoacrylates shown in Table 8 was incorporated with 1% by weight based on the weight of said mixture of Permek N to prepare a composition. This composition was used to bond two iron test pieces, heated at 150° C. or 173° C. for 1 hour, and then measured in tensile bonding strength at 150° C. or 173° C. The results obtained were as set forth in Table 8.

TABLE 8

| Alkyl group of alkyl α-cyanoacrylate | Tensile bonding strength (kg./cm.$^2$) | |
|---|---|---|
| | 150° C. | 173° C. |
| Methyl | 32 | 27 |
| Ethyl | 21 | 21 |
| Isobutyl | 20 | 15 |

Example 8

A mixture of allyl α-cyanoacrylate and 3% by weight of Permek N was incorporated with each of the additives shown in Table 9 to prepare a composition. This composition was used to bond two iron test pieces, heated at 150° C. for 1 hour, and then measured in tensile bonding strength at 150° C. The results obtained were as set forth in Table 9.

TABLE 9

| Additive | Amount of additive incorporated (wt. percent) | Tensile bonding strength (kg./cm.$^2$) |
|---|---|---|
| Allyl acrylate | 2 | 64 |
| Diallyl phthalate | 5 | 48 |
| Triallyl phosphate | 5 | 29 |
| Ethylene glycol dimethacrylate | 5 | 53 |
| Trimethylolpropane trimethacrylate | 2 | 34 |
| Rikaresin RE [1] | 5 | 51 |
| Acrycon [2] | 2 | 60 |

[1] Trademark of Shin Nippon Rika Co., the main component:

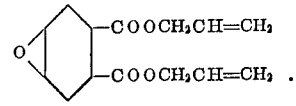

[2] Trademark of Mitsubishi Rayon Co., the main component: polymethyl methacrylate.

Example 9

A composition comprising allyl α-cyanoacrylate and 3% by weight of Permek N was used to bond iron test pieces and then subjected to tensile test before and after heating. Subsequently, two polymers were recovered from the two kinds of test pieces which had been formed, respectively, before and after heating, and the solubilities of said polymers for acetone were investigated to find that the former polymer was soluble and the latter polymer was entirely insoluble.

Example 10

A composition comprising propargyl cyanoacrylate and 0 to 3% by weight of Permek N was measured in bonding speed, bonding strength at room temperature, and bonding strength at 150° C. after heating at 150° C. for 3 hours. The results obtained were as set forth in Table 10.

TABLE 10

| Amount of Permek N (wt. percent) | Bonding speed (sec.) | Bonding strength (kg./cm.²) at— | |
|---|---|---|---|
| | | Room temperature | 150° C. |
| 0 | 30 | 298 | 15 |
| 1 | 60 | 297 | 60 |
| 3 | 60 | 220 | 62 |

What is claimed is:
1. Propargyl alpha-cyanoacrylate.

References Cited
UNITED STATES PATENTS

| 3,142,698 | 7/1964 | Halpern et al. | 260—465.4 |
| 3,254,111 | 5/1966 | Hawkins et al. | 260—465.4 |

JOSEPH PAUL BRUST, Primary Examiner

U.S. Cl. X.R.

260—30.6 R, 31.8 R, 464